United States Patent [19]

Neuerburg et al.

[11] Patent Number: 4,970,848

[45] Date of Patent: Nov. 20, 1990

[54] MOWER WITH RELEASE SAFETY DEVICE

[75] Inventors: Horst Neuerburg; Fernand Kieffer, both of Saverne, France

[73] Assignee: Kuhn, S.A., Saverne, France

[21] Appl. No.: 476,554

[22] Filed: Feb. 7, 1990

[30] Foreign Application Priority Data

Feb. 7, 1989 [FR] France ................... 89 01722

[51] Int. Cl.⁵ ............................................ A01D 75/18
[52] U.S. Cl. ..................................... 56/10.4; 56/15.3; 56/15.8; 56/15.9
[58] Field of Search .................... 56/10.4, 12.7, 15.3, 56/15.7, 15.8, 15.9

[56] References Cited

U.S. PATENT DOCUMENTS

| | | | |
|---|---|---|---|
| 3,390,515 | 7/1968 | Schaible et al. | 56/10.4 |
| 3,543,489 | 12/1970 | Maier et al. | 56/10.4 |
| 3,545,184 | 12/1970 | Liepold et al. | 56/10.4 |
| 3,664,057 | 5/1972 | Dunn | 56/10.4 |
| 4,722,173 | 2/1988 | Covington et al. | 56/15.9 |
| 4,747,255 | 5/1988 | Roden | 56/10.4 |
| 4,907,400 | 3/1990 | Roden | 56/10.4 |

FOREIGN PATENT DOCUMENTS

| | | |
|---|---|---|
| 60605 | 9/1982 | European Pat. Off. . |
| 116661 | 8/1984 | European Pat. Off. . |
| 277343 | 12/1987 | European Pat. Off. . |
| 0297012 | 12/1988 | European Pat. Off. . |
| 1782238 | 7/1971 | Fed. Rep. of Germany . |
| 3233560 | 8/1983 | Fed. Rep. of Germany . |
| 3431327 | 3/1986 | Fed. Rep. of Germany . |
| 3507475 | 9/1986 | Fed. Rep. of Germany . |
| 1472321 | 3/1967 | France . |
| 2587167 | 3/1987 | France . |
| 2052237 | 1/1981 | United Kingdom . |

*Primary Examiner*—Bruce M. Kisliuk
*Attorney, Agent, or Firm*—Oblon, Spivak, McClelland, Maier & Neustadt

[57] ABSTRACT

A mower includes a first chassis attachable to a tractor for movement in a work direction, a second chassis having first and second structures connected at a joint extending perpendicular to the work direction, and connecting rods, each having respective ends pivotally connected to the first chassis and to the second structure of the second chassis so as to form with the first and second chassis an upwardly deformable quadrilateral deformable such that the work elements may move to adapt to ground contours. A release safety device normally prevents pivoting of the first structure about the joint but permits pivoting of the first structure about the joint axis when the first structure or the working elements hooks an obstacle during movement of the mower in the work direction. This limits forces applied to the mower.

35 Claims, 6 Drawing Sheets

MOWER WITH RELEASE SAFETY DEVICE

BACKGROUND OF THE INVENTION

1. Field of the Invention

This invention relates to a mower comprising a first chassis by which it is hitched to a tractor, a second chassis supporting the work elements and connected to the first chassis by connecting rods constituting a deformable quadrilateral, particularly in an upward directed direction to make it possible for the second chassis and for the work elements that it supports to adapt to the contours of the ground.

2. Background of the Related Art

Such a mower is described in FR-A-2,458,981. This known mower comprises a first chassis which is formed by a frame of approximately rectangular shape, placed vertically and perpendicular to the direction of work. To this frame is fastened a hitching device intended to be hitched to the front hitch of a tractor. At each of the lateral ends of the frame of this first chassis, gussets are provided to each of which are connected—by joints with axes that extend horizontally and perpendicular to the direction of work—two connecting rods that extend backward and downward. At its back end, each connecting rod is connected, by a joint with an axis that is also horizontal and perpendicular to the direction of work, to a second chassis supporting cutting elements in the form of rotary disks provided with blades. These connecting rods form a parallelogram deformable in an upward directed direction. The second chassis comprises a U-shaped frame which is open backward and extends in an approximately horizontal plane. At the back part of each leg of the U, the frame is connected to an arm that extends downward and is provided at its lower end with a lug directed frontward in the direction of work. At their front end, these lugs are connected to a housing that extends perpendicular to the direction of work and above which said disks turn which are guided there in rotation. The frame of the first chassis also supports a first housing driven by a first universal joint telescopic drive shaft connected to the power takeoff of the tractor. This first housing, by means of a universal joint telescopic shaft, drives a second housing fastened to the frame of the second chassis and intended to transmit the movement to the disks.

Thanks to the connecting rods which connect the second chassis to the first chassis and which form at least approximately a parallelogram deformable in an upward directed direction, the second chassis and the cutting elements that it supports, can indeed adapt to the configuration of the ground on which the mower must work. As these connecting rods constitute at least approximately a drawn parallelogram, the second chassis slides more easily over the ground.

Although the second chassis can theoretically easily pass over bumps and obstacles, it has been proved in practice that deformations, indeed breaks, can appear particularly at the places on the second chassis where the upper connecting rods of the deformable parallelogram are connected, when said second chassis and/or cutting elements hook a large obstacle. These problems of breaks and deformations result particularly from the fact that the connecting points of the connecting rods of the deformable parallelogram on the second chassis extend a relatively great distance from the ground. Thus, when the cutting elements and/or the lower part of the second chassis hook an obstacle, the generated force acts on a relatively great lever arm.

In EP-A-0,277,343 a mower is described which is intended to be hitched to the back of a tractor. This known mower comprises a first chassis which is equipped with two wheels by which it rests on the ground, and with a hitching beam by which the mower is hitched to the tractor. This known mower comprises, moreover, a second chassis which supports cutting elements made in the form of rotary drums equipped with blades. This second chassis is connected to the first chassis by two pairs of connecting rods forming a parallelogram deformable in an upward direction. These connecting rods are connected at their back end to the second chassis and at their front end to the first chassis. This known mower comprises also a first housing fastened to the second chassis in its middle part and a second housing also fastened to the second chassis at a place offset crosswise in relation to the first housing and receiving the movement provided by the first housing by means of belts rotating in a horizontal plane.

In this known mower, the connecting points of the connecting rods of the deformable parallelogram on the second chassis also extend a relatively great distance from the ground. Thus this known mower should be subject to the same problems as those mentioned above, since the force generated when the rotary drums hook an obstacle also acts a very great lever arm.

In DE-A-1,782,238 a mower is described which comprises a chassis by which the mower is hitched to a tractor. This known mower, moreover, comprises cutting elements made in the form of rotary drums equipped with blades on their lower periphery. Each cutting element is connected to the chassis by connecting rods forming a parallelogram deformable in an upward direction. At the top of each rotary drum a bevel drive gear is placed that is used to drive the drum in rotation. The lead wheel of each bevel drive gear is connected in rotation to a respective shaft whose axis of rotation extends horizontal and perpendicular to the direction of work. These various shafts are connected in rotation to one another by universal joint telescopic shafts. The axes of the joints by which the lower connecting rods are connected to their corresponding cutting element are merged with the axis of rotation of the respective shaft. The upper connecting rod is equipped with a release safety device which, in case the drum hooks an obstacle, allows the shortening of said upper connecting rod and permits the drum to pivot backward around the axes of the joints of the lower connecting rods. In this known mower, no housing is provided that is intended to provide to the cutting elements the movement received from the power takeoff of the tractor. Moreover, it has been proved in practice that it was not desirable to incorporate the safety device in the connecting rods of the parallelogram. In addition, it appears that the various cutting elements can have among them only a minimum relative clearance. This results from the fact that the universal joint shaft, provided between two cutting elements, necessarily has a relatively short length, so that the angles that the universal joints can take very quickly exceed the admissible limit angles.

SUMMARY OF THE INVENTION

This invention has as an object to equip a mower with a safety mechanism without weakening the connecting rods which connect the second chassis to the first chassis and without risk for the drive elements of the work elements, while guaranteeing an optimal adaptation to the contours of the ground.

The above, and other, objects are achieved according to the present invention by a mower comprising a first chassis attachable to a tractor, whereby the mower may be moved by the tractor in a work direction; a second chassis comprising a first structure supporting work elements and a second structure fastened to the first structure at a joint with a geometric axis directed at least approximately horizontally and at least approximately perpendicular to the work direction; connecting rods, each having respective ends pivotally connected to said first chassis and to said second structure of said second chassis so as to form with said first and second chasses an upwardly deformable quadrilateral deformable such that said work elements may move to adapt to ground contours; and a release safety device comprising means for normally preventing pivoting of the first structure about the joint, and further comprising means for permitting rearward pivoting of the first structure about the joint when at least one of the first structure and the working elements hooks an obstacle during movement of the mower in the work direction, whereby the release safety device limits forces applied to the mower.

According to a feature of the invention, there are provided work element drive means comprising a first transmission housing fastened to the second structure and having an output shaft with an axis of rotation; a second transmission housing fastened to the first structure and having an input shaft with an axis of rotation; and a drive shaft connected between the output shaft of the first housing and the input shaft of the second housing. In one enbodiment the drive shaft is a telescopic drive shaft having universal joints and extending transverse to said work direction. Said transverse direction of the telescopic drive shaft is such that the universal joints pivot by small angles when the first structure pivots about the joint axis. In another enbodiment, the drive shaft has an axis of rotation coaxial with the joint axis.

The mowers according to this invention are no longer subject to the deformations and breaks that appear on the known mowers. This results from the fact that the release safety device limits the value of the force which is to be absorbed by the places on the second chassis where the upper connecting rod or rods of the deformable quadrilateral are connected.

Considering the fact that in normal work the position of the first housing does not vary in relation to the second housing, the second chassis and the work elements that it supports can have a very great travel, i.e. a very good capacity for adaptation to the contours of the ground without additional stresses appearing in the second drive shaft connecting the first and second housing. Only the first universal joint telescopic drive shaft which connects the drive source (generally the power takeoff shaft of the tractor) to the input shaft of the first housing undergoes a variation in length and a variation of the angles of the universal joints. Since, however, this shaft can have a relatively large length, these variations remain relatively limited, so that the stresses generated in this shaft by the adaptation of the second chassis and the work elements that it supports, on the contours of the ground, remain well below the admissible limit values.

It is only when the safety device releases that a relative displacement between the first housing and the second housing occurs. However, since it is provided in one embodiment that the direction of the second universal joint telescopic drive shaft that connects the first housing and the second housing is such that in the pivoting zone allowed by the release safety device, the angles of the universal joints do not exceed the admissible limit angles, no breaking of this drive shaft occurs. In another embodiment, it is provided that the axis of rotation of the second drive shaft is coaxial with the geometric axis of the joint around which the first structure of the second chassis pivots in conjunction with the work elements and the second housing. In this way, no breaking of this drive shaft can occur.

Furthermore, it should be noted that during this pivoting, the second structure of the second chassis and the first housing do not move. In this way, the first housing keeps its position in relation to the drive source. A breaking of the first universal joint telescopic drive shaft is therefore also precluded. The connecting rods are each made of a single part, so that they possess a good rigidity.

According to an additional characteristic of the invention, it is provided in one embodiment that, in a view along the geometric axis of the joint connecting the first structure and the second structure of the second chassis, the axis of rotation of the input shaft of the second housing comes close to the axis of rotation of the output shaft of the first housing during the pivoting of the first structure in relation to the second structure. In this case, the angles of the universal joints of the second drive shaft diminish during the pivoting.

A particularly advantageous design is obtained when in a view along the geometric axis of the joint connecting the first structure and the second structure of the second chassis, the distance from the axis of rotation of the output shaft of the first housing to the geometric axis of said joint is approximately equal to the distance from the axis of rotation of the input shaft of the second housing to the geometric axis of said joint.

Moreover, it is particularly advantageous that the axis of rotation of the output shaft of the first housing and the axis of rotation of the input shaft of the second housing be approximately parallel.

It is even preferably that these axes of rotation be at least approximately parallel to the geometric axis of the joint connecting the first structure and the second structure of the second chassis.

It is also preferable that in a view along the geometric axis of the joint connecting the first structure and second structure of the second chassis, the axis of rotation of the input shaft of the second housing extends in the vicinity of the geometric axis of said joint. The pivoting of the first structure and of the work elements in relation to the second structure can therefore be relatively great, while the displacement of the input shaft of the second housing remains relatively limited, even zero.

According to an additional characteristic of the invention, it is provided that the deformable quadrilateral is at least approximately a deformable parallelogram.

According to several other additional characteristics of the invention, it is provided that the first housing extends into the middle part of the mower seen along the direction of work, that the second housing extends in the vicinity of one of the ends of the second chassis and that the release safety device extends at the front part of the second chassis.

This release safety device comprises, according to an embodiment, two pins extending toward the front at least approximately parallel to the direction of work, one of said pins being connected to the first structure and the other of said pins being connected to the second structure, the two pins being positioned one over another; two flanges each comprising a recess partially surrounding each of the two pins, so that the two pins extend between said flanges; and an elastic device clamping the two flanges to the two pins.

This elastic device is positioned, according to an embodiment, between the two pins and, preferably, closer to one of the pins that the other pin. Thanks to this latter characteristic, the two flanges of the release safety device remain, during releasing, connected to the pin extending closest to the elastic device. In addition, to facilitate the reengaging of the release safety device, it is provided that the flanges be extended beyond the pin farthest from the elastic device by a distance such that at the end of the allowed pivoting zone, said pin still extends between the two flanges. It will suffice, in this case, simply to back up with the mower so that the first structure and the work elements that it supports pivot toward the front around the geometric axis of the joint connecting the first structure to the second structure, until said pin extends again into the two corresponding recesses.

According to a particularly advantageous embodiment, it is provided that the geometric axis of the joint connecting the first structure and the second structure of the second chassis extends approximately vertically above the front part of the work elements. In this case the first structure and the work elements that it supports do not penetrate into the ground during the pivoting backward around the geometric axis of said joint.

According to another particularly advantageous embodiment, it is provided that the geometric axis of the joint connecting the first structure and the second structure of the second chassis is coaxial with the geometric axis of the joint connecting either the upper connecting rod or rods, or the lower connecting rod or rods of the deformable quadrilateral to the second chassis. Preferably, the geometric axis of the joint connecting the first structure and the second structure of the second chassis is coaxial with the geometric axis of the joint connecting the lower connecting rod or rods to the second chassis.

So that the second chassis can easily slide over the surface of the ground, it has proved advantageous that the connecting rods of the deformable quadrilateral be connected at their front end to the first chassis from where they extend backward, considering the direction of work, and downward.

Although this invention can be used on a mower hitched to the back hitch of a tractor, it has proved particularly advantageous for a mower intended to be hitched to the front hitch of a tractor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Mower (1) shown in FIGS. 1 to 4 is intended to be hitched to a front hitch (2) of a tractor (3).

Figure 1:
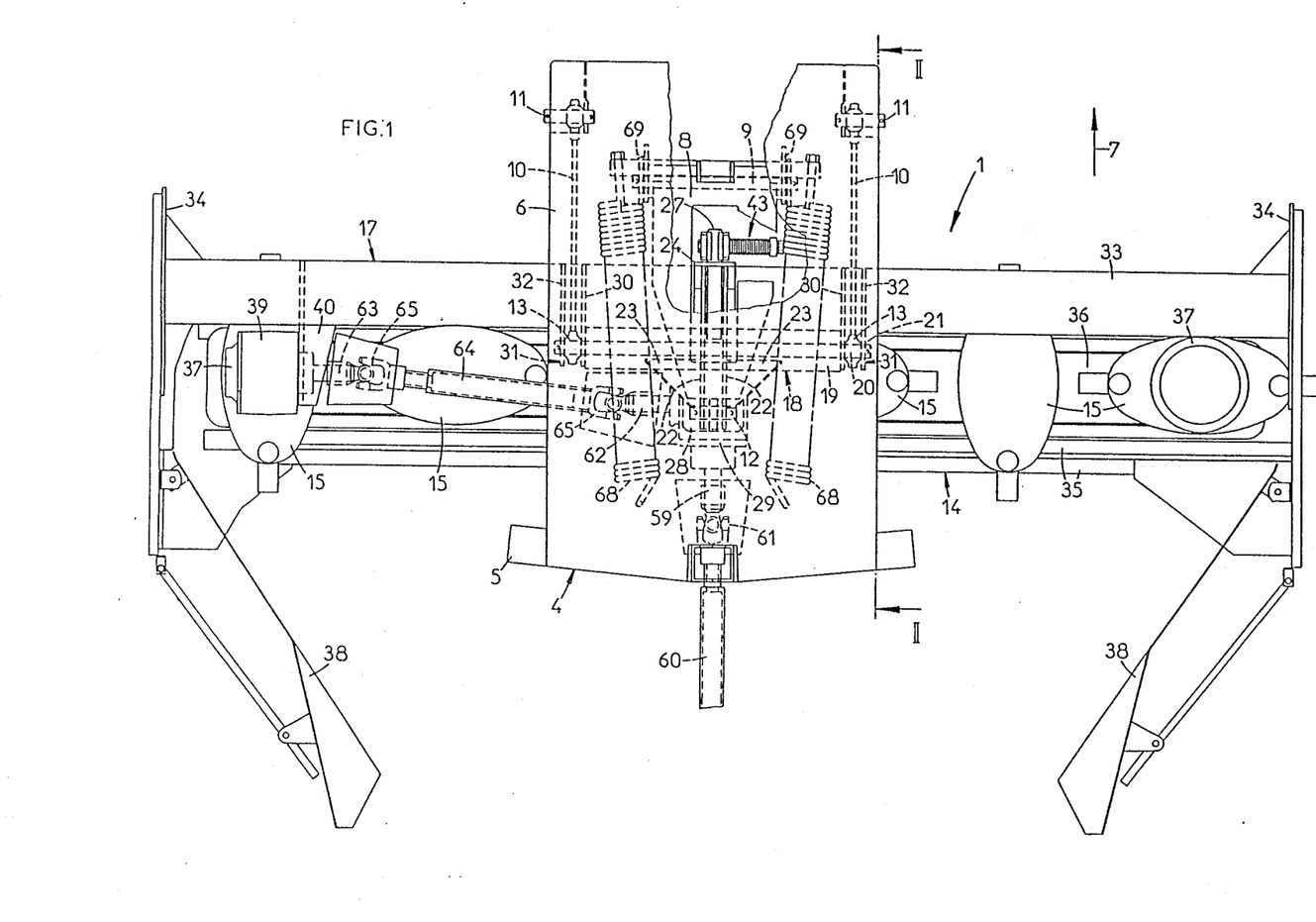
FIG. 1 is a top view of a first mower according to this invention.
Figure 2:
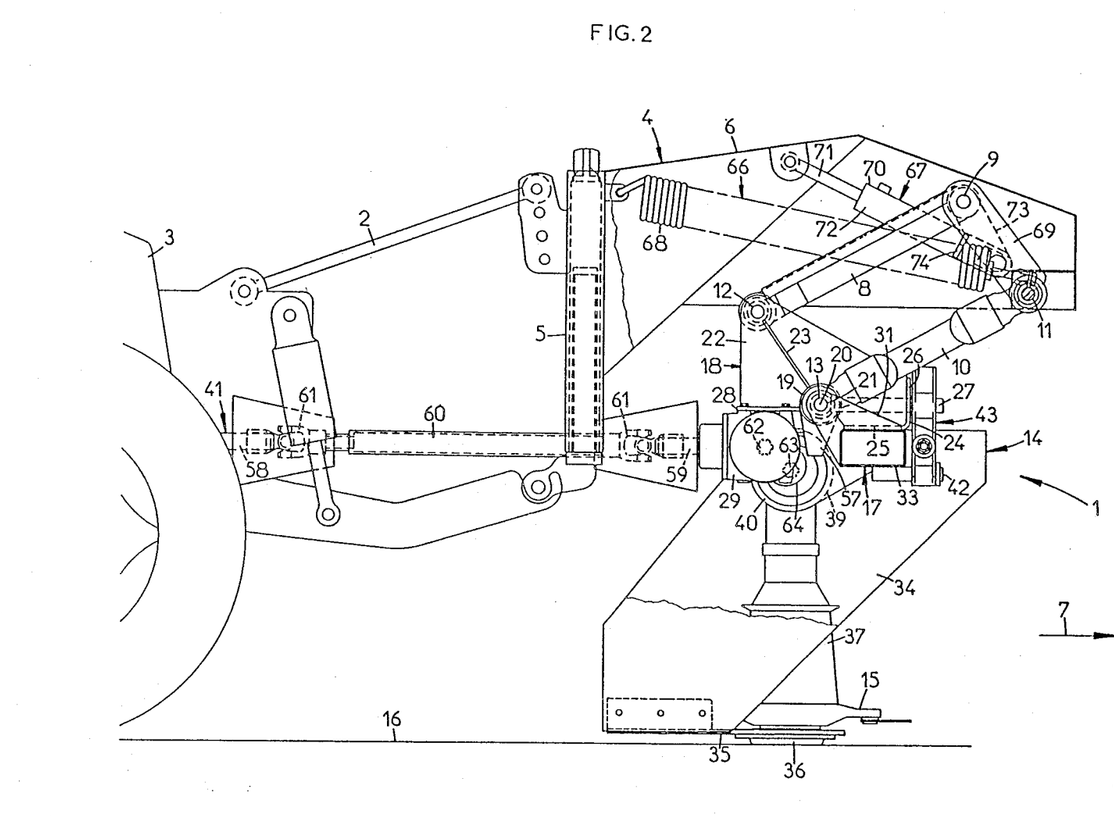
FIG. 2 is a lateral view of the mower according to FIG. 1, cut partially along plane II—II of FIG. 1.

It comprises, first of all, a first chassis (4) which is provided with a hitching device (5), by which it is hitched to said hitch (2). First chassis (4) is also provided with a body (6) which extends toward the front, considering the direction of work defined by arrow (7).

At the front part of body (6) are connected an upper connecting rod (8) by means of a joint (9) and two lower connecting rods (10) by means of a respective joint (11). Joint (9), by which the upper connecting rod (8) is connected to body (6) of first chassis (4), is a cylindrical joint whose geometric axis extends at least approximately horizontally and at least approximately perpendicular to the direction of work defined by arrow (7). Joints (11) on the other hand, by which lower connecting rods (10) are connected to body (6) of first chassis (4), are advantageously spherical joints.

Said connecting rods (8, 10) extend from first chassis (4) backward, considering the direction of work defined by arrow (7), and downward. At their respective back end, they are connected by means of joints (12), respectively (13), to a second chassis (14) which supports work elements (15). These joints (12, 13) are also advantageously spherical joints.

Joints (9, 11, 12, 13) are placed so that connecting rods (8, 10) form at least approximately a parallelogram deformable in an upward direction. Thanks to this connection, second chassis (14) and work elements (15) that it supports can follow in an optimal way the contours of ground (16) on which second chassis (14) is brought to slide during work. Actually, the deformable parallelogram formed by connecting rods (8, 10) makes it possible for second chassis (14) and for work elements (15) that it supports to rise and fall. Moreover, it should be noted that the clearing of bumps and depressions is facilitated by the fact that said parallelogram is drawn during work. Spherical joints (11, 12, 13) then impart to second chassis (14) and to work elements (15) that it supports, a certain mobility around a geometric axis extending at least approximately parallel to the direction of work defined by arrow (7). Cylindrical joint (9), finally, is intended to absorb the lateral forces generated in a curve. In this way, second chassis (14) and work elements (15) that it supports are prevented from being displaced laterally in relation to first chassis (4) when tractor (3) negotiates a curve.

Second chassis (14) which supports work elements (15), is, according to the invention, composed of two structures, a first structure (17) supporting work elements (15) and a second structure (18) to which connecting rods (8, 10) are connected.

Second structure (18) comprises a sleeve (19) which extends at least approximately horizontally and at least approximately perpendicular to the direction of work defined by arrow (7) and which serves as a bearing for a pin (20) defining a joint (21) with a geometric axis directed at least approximately horizontally and at least approximately perpendicular to said direction of work. Second structure (18) comprises, moreover, two parallel plates (22) extending at least approximately vertically and between whose upper ends the back end of upper connecting rod (8) extends which is connected there by means of joint (12). The two plates (22) are rigidly connected to sleeve (19) and are made rigid by means of a gusset (23). At their front part, the two plates (22) are rigidly connected to one another by means of an angle iron (24) extending perpendicular to the direction of work and one (25) of whose legs extends horizontally and the other (26) vertically. Second structure (18) also comprises a pin (27) extending at least approximately parallel to the direction of work. This pin (27) is fastened at its back end to sleeve (19) and goes through the vertical leg (26) of angle iron (24) to which it is fastened so that the front end of said pin (27) extends toward the front beyond said vertical leg (26). Second structure (18) also comprises a fastening plate (28) that is horizontal and, considering the direction of work, extends behind sleeve (19). This fastening plate (28) is rigidly connected to said sleeve (19), and to plates (22). It is used to fasten a first housing (29), whose function will be described later, to second structure (18).

As said above, sleeve (19) serves as a bearing for pin (20). In FIG. 1, it is seen very clearly that the two ends of this pin (20) come out of sleeve (19). Each of these ends goes through, respectively, first leg (30) of a clevis (31), the back end of a lower connecting rod (10) and second leg (32) of said clevis (31) which is fastened to first structure (17) of second chassis (14). In this way, first structure (17) is connected to second structure (18) by joint (21) formed by the two clevises (31) and pin (20). The ends of this pin (20) form, in addition, part of joint (13) by means of which lower connecting rods (10) are connected to second structure (18) of second chassis (14).

First structure (17) of second chassis (14) which supports work elements (15), is formed by the following elements. A tubular crosspiece (33), to which the two clevises (31) described above are fastened, extends at least approximately horizontally and at least approximately perpendicular to the direction of work. At each end, tubular crosspiece (33) is connected to the upper part of a lateral sheet metal piece (34) that extends in a plane at least approximately vertical and at least approximately parallel to the direction of work. At its lower part, each of lateral sheet metal pieces (34) is fastened to the corresponding end of a stiffener (35) which carries a beam (36). This beam (36) supports work elements (15) made here in the form of rotary disks that extend above said beam (36). These disks are, in a way known to a person skilled in the art, guided in rotation in beam (36) and driven in rotation by drive elements (not represented) housed in said beam (36). Each end disk, in addition, is surmounted by a rotary drum (37) which works with a corresponding stationary windrowing device (38) fastened to corresponding lateral sheet metal piece (34), to reduce the width of the windrow of product cut by the disks, which is deposited behind the mower.

Figure 3:
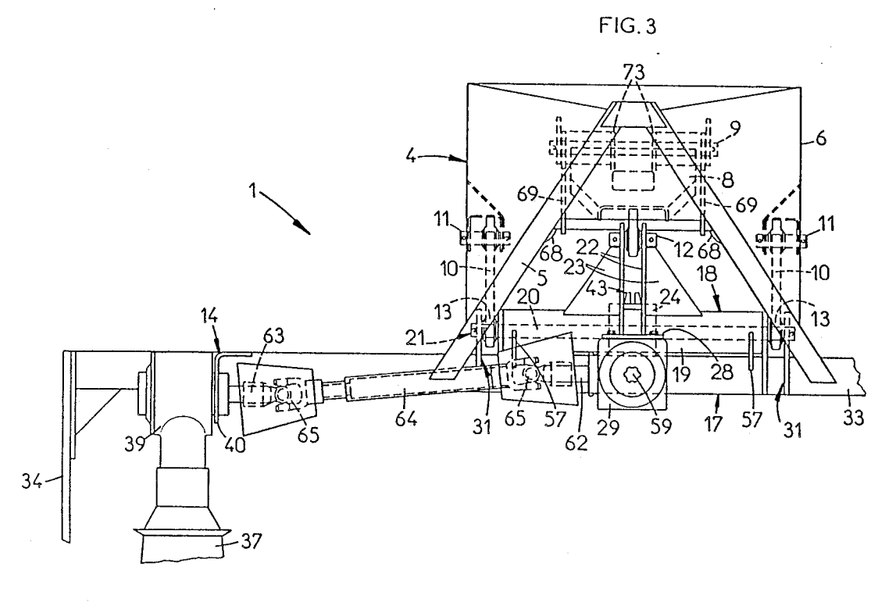
FIG. 3 is a partial view of the back of the mower shown in FIGS. 1 and 2.

Above one of rotary drums (37) a second housing (39) is provided which is fastened to tubular crosspiece (33) by means of a fastening element (40). This second housing (39) is a transmission housing known to a person skilled in the art, whose output shaft (not shown) extends at least approximately vertically through rotary drum (37) situated under said second housing (39), to transmit the movement to work elements (15) via the drive elements housed in beam (36).

The transmission of the movement from drive source (41), consisting of the front power takeoff of tractor (3), to work elements (15) will be explained later.

Under tubular crosspiece (33), approximately vertically below pin (27) fastened to second structure (18), is fastened a pin (42) that also extends at least approximately parallel to the direction of work.

Upper pin (27), fastened to second structure (18) and lower pin (42), fastened to first structure (17) form part of a release safety device (43). The latter, seen in the direction of work, extends into the middle part of mower (1) and into the front part of second chassis (14). Said release safety device (43) appears in greater detail in FIGS. 5 and 6. In addition to the two pins (27, 42), release safety device (43) further comprises two flanges (44, 45) which each have a recess (441, 442, 451, 452) surrounding over approximately 180° each of the two pins (27, 42), which extend between the flanges (44, 45), as well as an elastic device (46) clamping the two flanges (44, 45) to the two pins (27, 42). For this purpose, recesses (441, 442, 451, 452) exhibit a suitable shape to work with the shape of the pins (27, 42). Said elastic device (46) is positioned between the two pins (27, 42), but is closer to lower pin (42) than to upper pin (27). It is composed of a rod (47), which extends at least approximately perpendicular to the plane containing the two pins (27, 42), and of an elastic element (48). One of the ends of rod (47) goes through the two flanges (44, 45) which, for this purpose, have holes (49, 50) with a diameter somewhat larger than the diameter of said rod (47). At its end extending outside flange (45), said rod (47) is connected to a connecting piece (51) exhibiting a convex rounded surface (52) which is in contact with flange (45). At its other end extending outside the other flange (44), rod (47) is provided with a stack of elastic washers (53) constituting elastic element (48) and which are clamped between said flange (44) and a washer (54) held by a nut (55) screwed onto said end of rod (47) which, for this purpose, is threaded.

Figure 5:
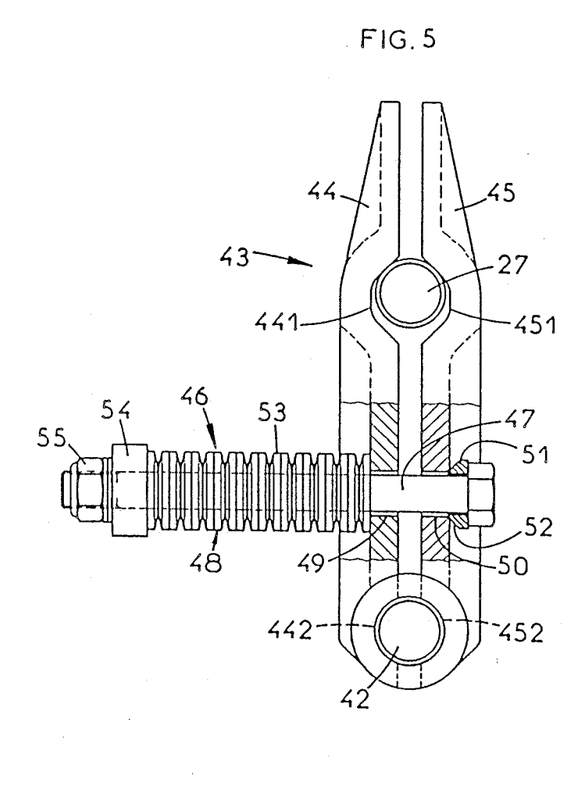
FIG. 5 is a view in section along plane V—V of FIG. 6 of the release safety device.
Figure 6:
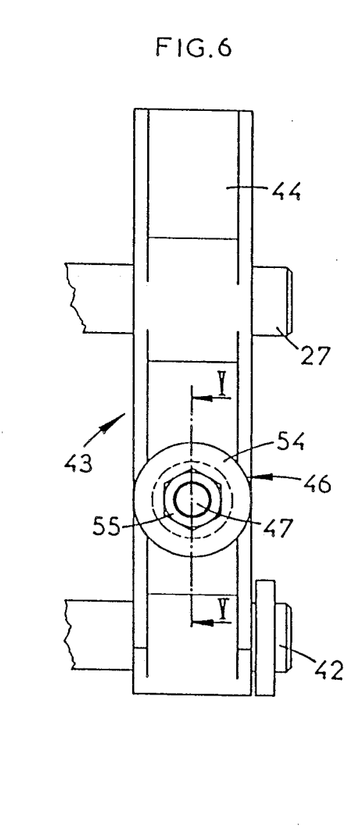
FIG. 6 is a lateral view of said release safety device.

Release safety device (43) which has just been described, in normal work, prevents the pivoting of first structure (17) in relation to second structure (18) backward around joint (21) consisting of pin (20) and clevises (31).

When first structure (17) and/or work elements (15) hook a large obstacle (56) (see FIG. 4), since tractor (3) is advancing, a force then occurs which tends to separate the two pins (27, 42) from one another. In so doing, pin (27) which is farther from elastic device (46) than pin (42), separates the two flanges (44, 45) from one another, by compressing elastic washers (53), until it can escape recesses (441, 451). This then makes it possible for first structure (17) and work elements (15) that it supports to pivot backward about the axis of joint (21) in relation to second structure (18).

Figure 4:
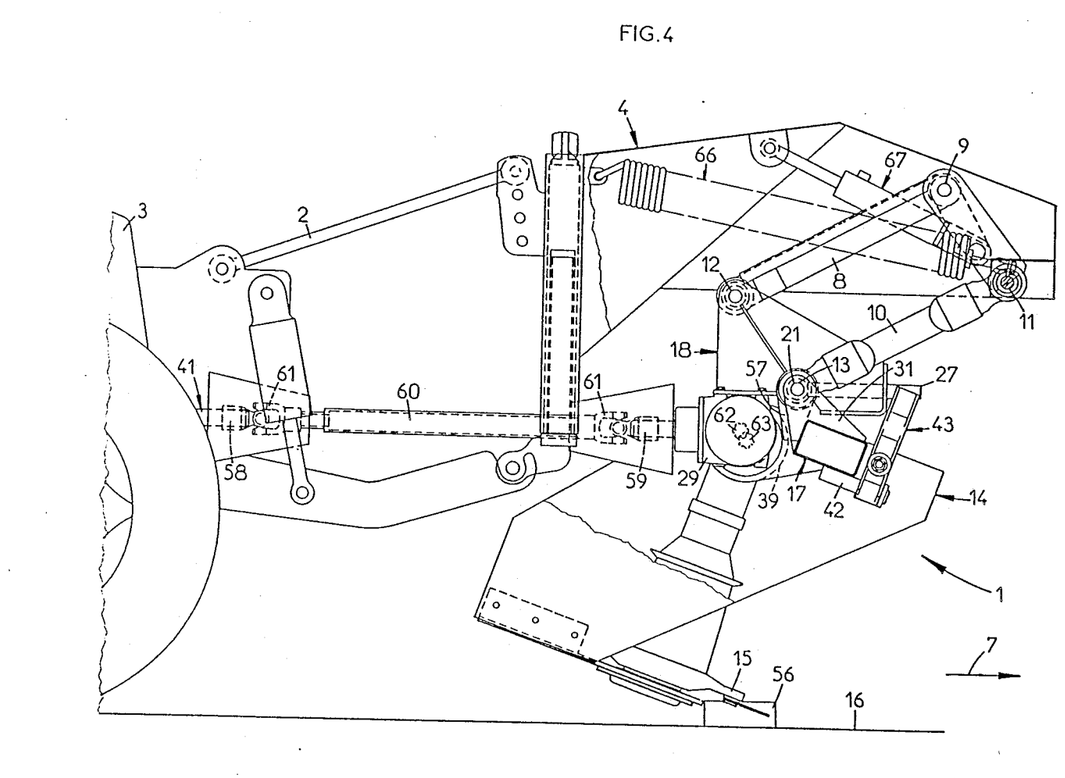
FIG. 4 is a view similar to that of FIG. 2, in which the first structure of the second chassis and the work elements that it supports are in released position.

Moreover, since joint (21) connecting first structure (17) to second structure (18) is at least approximately vertically above the front part of work elements (15), there is no risk that the latter penetrate into ground (16) during pivoting.

Between first structure (17) and second structure (18) a limitation element (57) is provided which limits the pivoting possible between said first structure (17) and said second structure (18) when safety device (43) has released (FIG. 4).

Each flange (44, 45) is extended upward beyond upper pin (27) by such a distance that, when limitation element (57) stops the pivoting of first structure (17) in relation to second structure (18), pin (27) still extends between the two flanges (44, 45) (FIG. 4). In this way, the reengaging of safety device (43) will be very easy. Actually, it will be sufficient simply to back up with tractor (3) until pin (27) again extends between the two corresponding recesses (441, 451).

It should further be noted that the releasing force can be adjusted thanks to nut (55) which may be screwed more or less far on rod (47) so as to compress more or less strongly elastic washers (53).

As said above, work elements (15) receive movement from a drive source (41), consisting of the front power takeoff of tractor (3), which comprises a shaft (58) whose axis of rotation is directed at least approximately parallel to the direction of work. First housing (29) which, in a view along the direction of work, extends into the middle part of mower (1), is equipped with an input shaft (59) extending backward and whose axis of rotation is also at least approximately parallel to the direction of work. This input shaft (59) of first housing (29) receives the movement of shaft (58) of the power takeoff of tractor (3) via a first telescopic drive shaft (60) with universal joints (61) whose longitudinal axis, in top view, extends at least approximately in the direction of work. Moreover, as seen in FIG. 2, in an intermediate position of the travel allowed by the deformable parallelogram, said first telescopic drive shaft (60) also extends at least approximately horizontally.

First housing (29) which is an angle transmission housing is provided with an output shaft (62) whose axis of rotation extends at least approximately horizontally and at least approximately perpendicular to the direction of work. This output shaft (62) of first housing (29) is directed toward second housing (39) which comprises an input shaft (63) whose axis of rotation also extends at least approximately horizontally and at least approximately perpendicular to the direction of work. In this way, output shaft (62) of first housing (29) and input shaft (63) of second housing (39) are at least approximately parallel to one another.

Input shaft (63) of second housing (39) which is directed toward first housing (29), receives the movement of output shaft (62) of said first housing (29), via a second telescopic drive shaft (64) with universal joints (65). The longitudinal axis of this telescopic drive shaft (64), in top view, extends in a direction crosswise to the direction of work. Moreover, it is seen from FIGS. 2 and 3 that telescopic drive shaft (64) also extends somewhat downward, given that input shaft (63) of second housing (39) is situated somewhat lower than output shaft (62) of first housing (29). The direction of this telescopic drive shaft (64) is such that the angles of the universal joints (65) are relatively small. Moreover, it should be noted that these angles do not vary during normal work, since the relative position of first housing (29) in relation to second housing (39) does not vary during the adaptation of second chassis (14) and work elements (15) that it supports to the contours of ground (16).

In FIG. 2, it is also seen that the axis of rotation of output shaft (62) of first housing (29) and the axis of rotation of input shaft (63) of second housing (39) are at least approximately parallel to the geometric axis of joint (21) and extend into the vicinity of this geometric axis. Moreover, the geometric axis of joint (21) extends higher and in front of the axis of rotation of output shaft (62) of first housing (29), while the axis of rotation of input shaft (63) of second housing (39) extends lower and in front of said geometric axis of rotation of output shaft (62) of first housing (29). Finally, the distance between the axis of rotation of input shaft (63) of second housing (39) and the geometric axis of joint (21) is approximately equal to the distance between the axis of rotation of output shaft (62) of first housing (29) and the geometric axis of said joint (21).

In this way, as appears very clearly in FIG. 4, during the pivoting of first structure (17) and work elements (15) that it supports in relation to second structure (18) around the geometric axis of joint (21), the axis of rotation of input shaft (63) of second housing (39) comes close to the axis of rotation of output shaft (62) of first housing (29). The angles of universal joints (65) of the second telescopic drive shaft (64) thus diminish during pivoting. In this way, there is no danger of damaging the second telescopic drive shaft (64) during the pivoting allowed by release safety device (43).

Also, there is no risk of damaging the first telescopic drive shaft (60), since as seen very clearly in FIG. 4, during pivoting the position of first housing (29) does not change in relation to shaft (58) of the power takeoff of tractor (3).

The position of first housing (29) in relation to shaft (58) of the power takeoff of tractor (3) changes during the deformation of the parallelogram that makes possible the adaptation of the second chassis (14) and of work elements (15) that it supports to the contours of ground (16). Since the length of the first telescopic drive shaft (60) can, however, be relatively long, the angles of the universal joints (61) remain relatively small. Moreover, it should be noted that during the deformation of the parallelogram, input shaft (59) of first housing (29) still remains at least approximately parallel to shaft (58) of the power takeoff of tractor (3).

In FIGS. 1 and 2, it is also seen that mower (1) is provided with a lightening device (66) and with a lifting device (67).

Lightening device (66) comprises two draw springs (68) which, in top view, extend on both sides of upper connecting rod (8). At one of their ends, said springs (68) are connected to body (6) of first chassis (4). At their other end, said springs (68) are connected to a respective lever (69) fastened to upper connecting rod (8), in the vicinity of joint (9) by which said upper connecting rod (8) is connected to body 6 of first chassis (4). Each lever (69) extends from connecting rod (8) downward and toward the front and corresponding spring (68) is connected to its front end. Springs (68) thus exert, by levers (69), a torque on upper connecting rod (8), so that second chassis (14) rests less heavily on ground (16). The lightening device (66) is placed so that in the travel zone allowed by the deformable parallelogram, the lightening force remains relatively constant.

Lifting device (67) comprises a hydraulic cylinder (70) whose rod (71) is connected to body (6) of first chassis (4) and whose cylinder (72) is connected to the free end of a clevis (73). At its other end, clevis (73) is connected to body (6) of first chassis (4) so as to be able to turn freely around a geometric axis merged with the geometric axis of cylindrical joint (9), by which upper connecting rod (8) is connected to first chassis (4). Clevis (73) further comprises a stop (74). Thus, when oil is injected into cylinder (70), it contracts and draws on clevis (73) which pivots around the geometric axis of joint (9). When stop (74) comes in contact with the lower part of upper connecting rod (8), it drives said upper connecting rod (8) so as to pivot, which has the effect of lifting second chassis (14).

Figure 7:
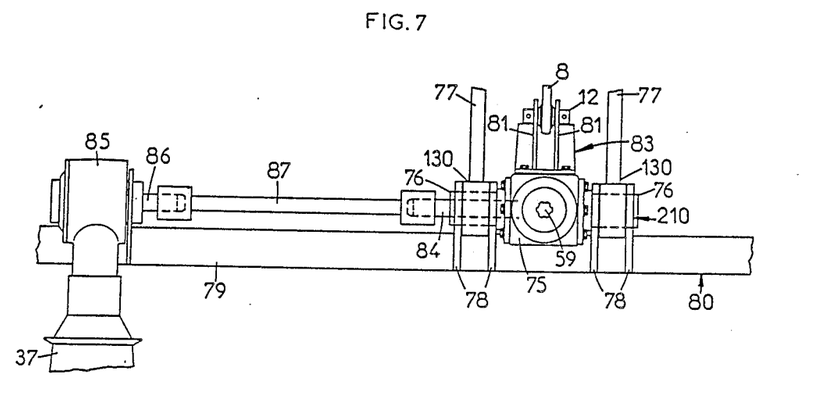
FIG. 7 is a diagrammatic and partial view of the back of a second mower according to this invention.
Figure 8:
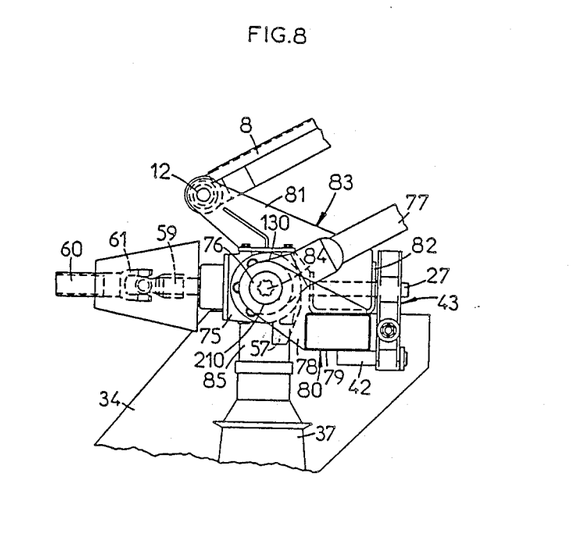
FIG. 8 is a lateral view of the mower of FIG. 7.

In FIGS. 7 and 8 another embodiment of this invention is diagrammatically shown which differs from the one which has just been described by the arrangement of the first housing on the second structure and of the second drive shaft extending between this first housing and the second housing.

Actually, in this example, first housing (75) has two cylindrical bearing surfaces (76) with a common geometric axis at least approximately horizontal and directed at least approximately perpendicular to the direction of work. These cylindrical bearing surfaces (76) serve for the connection of the back end of lower connecting rods (77) similar to lower connecting rods (10) and of clevises (78) similar to clevises (31). These clevises (78) are connected to a tubular crosspiece (79) similar to tubular crosspiece (33). This tubular crosspiece (79) is part of a first structure (80) similar to first structure (17).

To first housing (75) are fastened two parallel plates (81) that extend at least approximately vertically and between the upper ends of which the back end of upper connecting rod (8) extends which is connected there by means of joint (12). At their front part, the two plates (81) are rigidly connected to one another by means of an angle iron (82) similar to angle iron (24). Second structure (83) thus made, similar to second structure (18), also comprises a pin (27) that is part of release safety device (43).

First housing (75) comprises an output shaft (84) whose axis of rotation extends at least approximately horizontally and at least approximately perpendicular to the direction of work.

First structure (80) comprises a second housing (85) similar to second housing (39), which is fastened to tubular crosspiece (79). This second housing (85) comprises an input shaft (86) directed toward output shaft (84) of first housing (75) and whose axis of rotation is merged with that of said output shaft (84). Moreover, it is also seen from FIGS. 7 and 8 that the common axis of rotation of output shaft (84) of first housing (75) and of input shaft (86) of second housing (85) is also coaxial with the geometric axis of cylindrical bearing surfaces (76) of first housing (75), i.e., on the one hand, with the geometric axis of joints (130) by which lower connecting rods (77) are connected to first housing (75) (second structure (83)) and, on the other hand, with the geometric axis of joint (210) by which first structure (80) is connected to first housing (75) (second structure (83)). A second drive shaft (87) transmits the movement of first housing (75) to second housing (85). The axis of rotation of this second drive shaft (87) is therefore also coaxial with the geometric axis of joint (210) connecting first structure (80) to second structure (83). In this way, when safety device (43) releases, and first structure (80) pivots in relation to second structure (83), no stress will occur in second drive shaft (87).

While the examples of embodiment which have just been described relate to mowers intended to be hitched to the front hitch of a tractor, it is understood that the invention can also be applied to a mower hitched or pulled behind a tractor.

What is claimed as new and desired to be secured by Letters Patent of the United States is:

1. A mower comprising:
    a first chassis attachable to a tractor, whereby said mower may be moved by the tractor in a work direction;
    a second chassis comprising a first structure supporting work elements and a second structure fastened to the first structure at a joint with a geometric axis directed at least approximately horizontally and at least approximately perpendicular to said work direction;
    connecting rods, each having respective ends pivotally connected to said first chassis and to said second structure of said second chassis so as to form with said first and second chassis an upwardly deformable quadrilateral deformable such that said work elements may move to adapt to ground contours; and
    a release safety device comprising means for normally preventing pivoting of the first structure about the joint, and further comprising means for permitting rearward pivoting of said first structure about said joint when at least one of said first structure and said working elements hooks an obstacle during movement of the mower in said work direction.

2. Mower according to claim 1, including work element drive means comprising:
    a first transmission housing fastened to said second structure and having an output shaft with an axis of rotation;
    a second transmission housing fastened to said first structure and having an input shaft with an axis of rotation; and
    a telescopic drive shaft having universal joints and extending transverse to said work direction, said telescopic drive shaft being connected between said output shaft of said first housing and said input shaft of said second housing,
    wherein said transverse direction of said telescopic drive shaft is such that said universal joints pivot by small angles when said first structure pivots about the joint axis.

3. Mower according to claim 2, wherein in a view along said joint axis, the axis of rotation of said input shaft of said second housing is close to the axis of rotation of said output shaft of said first housing during the pivoting of first structure.

4. Mower according to claim 2, wherein in a view along said joint axis, said joint axis is positioned in front of and higher than the axis of rotation of said output shaft of said first housing, and wherein the axis of rotation of said input shaft of said second housing extends in front of and lower than said axis of rotation of said output shaft of said first housing.

5. Mower according to claim 2, wherein in a view along said joint axis, the distance of the axis of rotation of said output shaft of said first housing from said joint axis is at least approximately equal to the distance of the axis of rotation of said input shaft of said second housing from said joint axis.

6. Mower according to claim 2, wherein the axis of rotation of said output shaft of said first housing and the axis of rotation of said input shaft of said second housing are at least approximately parallel.

7. Mower according to claim 6, wherein the axis of rotation of said output shaft of said first housing and the axis of rotation of said input shaft of said second housing are at least approximately parallel to said joint axis.

8. Mower according to claim 2, wherein in a view along said joint axis, the axis of rotation of said input shaft of said second housing extends in the vicinity of said joint axis.

9. Mower according to claim 8, wherein in a view along said joint axis, the axis of rotation of said output shaft of said first housing extends in the vicinity of said joint axis.

10. Mower according to claim 9, wherein in a view along said joint axis, the axis of rotation of said output shaft of said first housing and the axis of rotation of said input shaft of said second housing are coaxial with said joint axis.

11. Mower according to claim 2, wherein said first housing extends into a middle part of said mower as seen in said work direction.

12. Mower according to claim 2, wherein said first housing has an input shaft extending at least approximately parallel to said work direction.

13. Mower according to claim 2, wherein said second housing extends into the vicinity of one of the ends of said second chassis.

14. Mower according to claim 1, including work element drive means comprising:
- a first transmission housing fastened to said second structure and having an output shaft with an axis of rotation;
- a second transmission housing fastened to said first structure and having an input shaft with an axis of rotation; and
- a drive shaft having an axis of rotation coaxial with said joint axis, said drive shaft being connected between said output shaft of said first housing and said input shaft of said second housing.

15. Mower according to claim 14, wherein said first housing extends into a middle part of said mower as seen in said work direction.

16. Mower according to claim 14, wherein said first housing has an input shaft extending at least approximately parallel to said work direction.

17. Mower according to claim 14, wherein said second housing extends into the vicinity of one of the ends of said second chassis.

18. Mower according to claim 1, wherein said deformable quadrilateral is at least approximately a deformable parallelogram.

19. Mower according to claim 1, wherein said release safety device is positioned at a front part of said second chassis.

20. Mower according to claim 1, wherein said release safety device is positioned at a middle part of the mower as seen in the work direction.

21. Mower according to claim 1, wherein said release safety device comprises:
- two pins extending toward the front of the mower at least approximately parallel to the work direction, one of said pins being connected to said first structure and the other of said pins being connected to said second structure, one of said two pins extending above the other;
- two flanges each comprising recesses partially surrounding each of the two pins, so that said two pins extend between said flanges; and
- an elastic device clamping said two flanges to said two pins.

22. Mower according to claim 21, wherein the upper one of said pins is connected to said second structure and the lower one of said pins is connected to said first structure.

23. Mower according to claim 22, wherein said recesses have a shape for engagement with said pins.

24. Mower according to claim 23, wherein each of said recesses surrounds a corresponding one of said pins over approximately 180°.

25. Mower according to claim 21, wherein said elastic device is positioned between said pins.

26. Mower according to claim 25, wherein said elastic device is closer to one of said pins than to the other of said pins.

27. Mower according to claim 26, wherein said elastic device is closer to the lower one of said pins.

28. Mower according to claim 26, wherein said flanges extend beyond the one of said pins farthest from said elastic device by such a distance that said one of said pins is still positioned between said flanges when said first structure has pivoted about said joint.

29. Mower according to claim 21, wherein said elastic device comprises:
- a rod extending at least approximately perpendicular to a plane containing said two pins, one end of said rod going through said first flange and being connected to said second flange; and
- an elastic element clamped between said first flange and a nut screwed on an other end of said rod.

30. Mower according to claim 29, wherein said elastic element comprises a stack of elastic washers.

31. Mower according to claim 1, including limitation means for limiting the pivoting of said first structure about said joint.

32. Mower according to claim 1, wherein said joint axis extends approximately vertically above a front part of said work elements.

33. Mower according to claim 1, wherein said joint axis is coaxial with the geometric axis of a joint connecting the end of one or more of said connecting rods to said second chassis.

34. Mower according to claim 1, wherein said connecting rods connecting said second chassis to said first chassis are connected at their front end to said first chassis from which they extend backward and downward.

35. Mower according to claim 1, wherein said first chassis including means for attachment to a front hitch of a tractor.

* * * * *